(12) United States Patent
Kvernvold

(10) Patent No.: US 8,909,479 B2
(45) Date of Patent: Dec. 9, 2014

(54) APPARATUS AND METHOD FOR DETECTING AND QUANTIFYING LEAKAGE IN A PIPE

(75) Inventor: Morten Kvernvold, Stavanger (NO)

(73) Assignee: ScanWell AS, Sandnes (NO)

( * ) Notice: Subject to any disclaimer, the term of this patent is extended or adjusted under 35 U.S.C. 154(b) by 498 days.

(21) Appl. No.: 13/379,982

(22) PCT Filed: Jun. 24, 2010

(86) PCT No.: PCT/NO2010/000245
§ 371 (c)(1),
(2), (4) Date: Jan. 13, 2012

(87) PCT Pub. No.: WO2010/151144
PCT Pub. Date: Dec. 29, 2010

(65) Prior Publication Data
US 2012/0136579 A1 May 31, 2012

(30) Foreign Application Priority Data

Jun. 26, 2009 (NO) .................................. 20092445

(51) Int. Cl.
*G06F 19/00* (2011.01)
*G01V 9/02* (2006.01)
*E21B 47/10* (2012.01)
*G01M 3/28* (2006.01)
*G01M 3/26* (2006.01)
*E03B 7/07* (2006.01)
*F17D 1/08* (2006.01)
*F17D 5/02* (2006.01)

(52) U.S. Cl.
CPC .............. *E21B 47/1025* (2013.01); *E03B 7/071* (2013.01); *F17D 1/08* (2013.01); *F17D 5/02* (2013.01); *G01M 3/2807* (2013.01); *G01M 3/26* (2013.01); *G01M 3/2815* (2013.01); *G01M 3/283* (2013.01)
USPC ................. 702/12; 73/40.5 R; 73/40; 73/864; 166/250.02; 166/250.17

(58) Field of Classification Search
CPC ............. E03B 7/071; F17D 1/08; F17D 5/02; G01M 3/2807; G01M 3/26; G01M 3/2815; G01M 3/283; E21B 47/1025
USPC ....... 702/12; 73/40.5 R, 40, 864; 166/250.02, 166/250.17
See application file for complete search history.

(56) References Cited

U.S. PATENT DOCUMENTS 3,817,086 A * 6/1974 Dorgebray ................. 73/40.5 R
4,474,053 A 10/1984 Butler
(Continued)

OTHER PUBLICATIONS

Al-Tamirni, et al, Design and fabrication of a low rate metering skid . . . , Abu Dhabi Int. Petroleum Exhibition Conf, Nov. 3-6, 2008, UAE, SPE 117961. Plate 4, line 1, p. 7.

*Primary Examiner* — Carol S Tsai
(74) *Attorney, Agent, or Firm* — Gable Gotwals

(57) ABSTRACT

The present invention is directed toward a method and an apparatus to investigate and quantify a leakage rate for a fluid between a first pipe and a second pipe, the first pipe being surrounded by at least a portion of the second pipe, where the pipes are arranged in a well in a ground and where a measuring arrangement including a flow meter and a pressure meter is put into fluid communication with an annulus defined by the first pipe and the second pipe, where fluid in the gaseous phase is conveyed through the measuring arrangement, as the annulus is used as a separation chamber for gas and liquid.

11 Claims, 3 Drawing Sheets

(56) References Cited

U.S. PATENT DOCUMENTS

Figure 1:
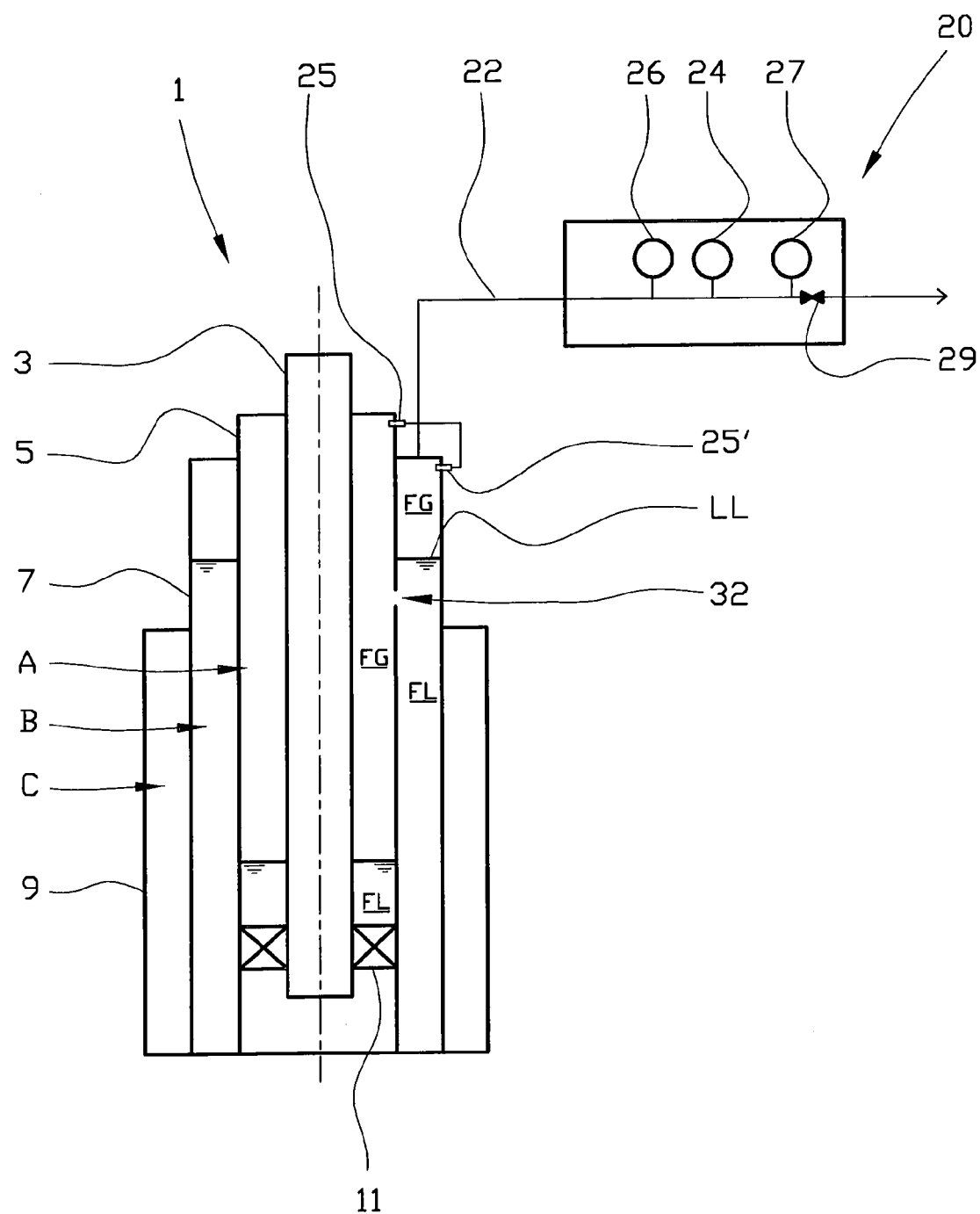

| | | | |
|---|---|---|---|
| 5,343,737 A * | 9/1994 | Baumoel | 73/40.5 R |
| 5,453,944 A * | 9/1995 | Baumoel | 703/2 |
| 6,575,242 B2 * | 6/2003 | Woie | 166/250.02 |
| 8,109,158 B2 * | 2/2012 | Guieze et al. | 73/864 |
| 8,256,532 B2 * | 9/2012 | Gray | 175/48 |
| 2003/0025081 A1 * | 2/2003 | Edner et al. | 250/339.09 |
| 2007/0051511 A1 | 3/2007 | Davila | |
| 2010/0269696 A1 * | 10/2010 | Sarshar et al. | 95/243 |
| 2011/0061475 A1 * | 3/2011 | Guieze et al. | 73/864 |
| 2011/0125333 A1 * | 5/2011 | Gray | 700/282 |
| 2014/0026644 A1 * | 1/2014 | Patel et al. | 73/40 |

* cited by examiner

APPARATUS AND METHOD FOR DETECTING AND QUANTIFYING LEAKAGE IN A PIPE

CROSS-REFERENCE TO RELATED APPLICATIONS

This application is the United States National Phase of PCT Patent Application No. NO2010/000245 filed on 24 Jun. 2010, which claims priority to Norwegian Patent Application No 20092445 filed 26 Jun. 2009, both of which are incorporated herein by reference.

BACKGROUND OF THE INVENTION

The present invention relates to a method and an apparatus for being able to detect and quantify leakage in a pipe. More particularly it concerns a method and an apparatus to investigate and quantify the leakage rate of a fluid between a first pipe and a second pipe, the first pipe being surrounded by at least a portion of the second pipe, where the pipes are arranged in a well in the ground. The well may for example be a well for production of petroleum fluids from a reservoir.

In the oil and gas industry there is a requirement that all oil, gas and injection wells at all times have at least two independent barriers between a reservoir and the surrounding environment at the well surface. Cementing and casings constitute one of these barriers and shall prevent flow of fluids behind casings from the reservoir and up toward the well surface.

In order to have control of the integrity of the well barriers, there is a requirement for detecting a continued building up of pressure in the casing annulus. Such a building up is an indication of failure in one or more well barriers. A person skilled in the art will know that a failure of a well barrier may have disastrous consequences. Even if the well barriers ideally speaking shall be absolutely tight, a certain degree of leakage is accepted. One of the standards setting out the limits for the degree of leakage allowed for oil, gas and water is API RP 14B. If the leakage exceeds the set limits, action must be taken. The well then has what in the industry is called a "Sustained Casing Pressure" which for a person skilled in the art will be known as SCP. A common method to decide whether a well has SCP, is to bleed off the annulus pressure through a needle valve. If it is not possible to reduce the pressure in the annulus to zero within 24 hours, then the well per definition has SCP.

To decide on further measures for the well having SCP, the leakage rate has to be determined. The most common way to do this is by means of a so-called pressure build-up analysis.

A pressure build-up analysis includes as a minimum the following:
- the pressure in the annulus is introductorily bled to zero overpressure. This is controlled by means of a bleed valve for the annulus. The bleed valve is typically arranged on the surface.
- When the pressure is bled down to zero, the volume of gas in the annulus must be determined. This may be done by means of an acoustic measurement detecting the level at which the interface between gas and liquid, i.e. the liquid surface, is. Provided that the well geometry is known, the volume of gas may then be decided.
- After the pressure is reduced to zero overpressure and the volume of gas in the annulus is established, the pressure build-up analysis may continue. This is done by closing the bleed valve.
- For each interval the leakage rate shall be worked out, a calculation of the gas volume must be done. The leakage rate worked out will be an average leakage rate over the pressure interval.
- In addition to the above the characteristic features such as density, compressibility and the molecular weight of the gas must be measured to be able to do the calculations of gas volume and leakage rate at standard/normal conditions.

The above method and equipment used in practicing the method, is thoroughly explained in the publication SPE 117961 titled "Design and Fabrication of a Low Rate Metering Skid to Measure Internal Leak Rates of Pressurized Annuli for Determining Well Integrity Status" published by Society of Petroleum Engineers in 2008.

There are several drawbacks related to the above, prior art.

As appearing from the above, a test to examine whether a well has SCP could last for up to 24 hours. A subsequent pressure build-up analysis may take as much as another 48 hours to do. To be able to calculate leakage rates from the pressure build-up analysis the following additional parameters need to be known: the gas volume being present in the annulus when measurements starts, the gas properties, the well geometry and the gas volume being present in the annulus when the measurement ends.

The prior art method is thus very time consuming in addition to a requirement for relatively comprehensive calculations. There are moreover many potential sources of errors such as measurement of the temperature profile of the gas, compressibility factor or so-called Z-factor, measurement of the volume of the gas and to a certain extent also the gas pressure.

A considerable drawback related to the prior art method is that the result of the measurements only gives an average leakage rate over the pressure interval. The object of the invention is to remedy or reduce at least one of the prior art drawbacks.

The object is achieved by the features stated in the below description and in the following claims.

According to a first aspect there is provided a method to investigate and quantify leakage rate of a fluid between a first pipe and a second pipe, the first pipe being surrounded by at least a portion of the second pipe, where the pipes are arranged in a well in a ground, the method including the steps of:
- installing a measuring arrangement including a flow meter and a pressure gauge in fluid communication with an annulus surrounding a leakage site in the first pipe, the pressure gauge being connected to pressure sensors arranged to measure a pressure difference between the annuli;
- providing by means of a pressure-regulating valve arranged downstream of the measuring arrangement a constant pressure difference between the annuli surrounding the leakage site; and
- conveying fluid in gas phase from the annulus connected to the measuring arrangement through the measuring arrangement, said annulus being utilised as a separation chamber for gas and liquid.

If, according to metering criteria determined in standard, a constant temperature in the system and through the measuring arrangement is presupposed, the temperature has to be measured. The temperature is preferably measured in the measuring arrangement.

By providing a constant differential pressure over the leakage site, the leakage rate will be constant. The pressure upstream of the leakage site will normally be constant. Pressure downstream of the leakage site is controlled through the measuring system.

By utilising the annulus as a separation chamber the need for a separate separation container is eliminated. The measuring arrangement may thus be made considerably smaller and thereby more mobile at the same time as possibilities are opened up for additionally being able to measure liquid leakage in addition to gas leakage.

To be able to detect any liquid leakage between the first pipe and the second pipe, an acoustic measuring device is placed in connection with the annulus. This is to be able to detect any change in the liquid level in the annulus. Such a change in the liquid level means that the mutual relationship between gas volume and liquid volume in the annulus is changing.

To be able to determine at least some of the characteristics of the gas flowing through the flow meter, it is an advantage if the gas analyser is positioned in connection with the measuring arrangement. The gas analyser will analyse which gases constitute the leakage gas in the annulus and be able to provide information in real time about the composition of the leakage gas. Thus the PVT-properties (pressure, volume and temperature) of the leakage gas may be provided.

Advantageously at least parts of the measuring arrangement is placed distant from the well, for example onboard a rig or a production vessel. This ensures an easy access to the equipment constituting the measuring arrangement, which is an advantage in connection with maintenance at the same time as the equipment does not need to be designed to stand up to the extreme environments that may exist in a well.

In a second aspect of the invention there is provided an apparatus to investigate and quantify a leakage rate of a fluid between a first pipe and a second pipe, the first pipe being surrounded by at least a portion of the second pipe, where the pipes are arranged in a well in the ground, the apparatus including:
 a separation chamber to be able to separate the fluid into a gas phase and a liquid phase;
 a measuring arrangement being in fluid communication with the separation chamber, where the measuring arrangement includes a flow meter for gas, a pressure gauge connected to pressure sensors arranged to measure a pressure difference between either side of a leakage site, and a pressure-regulating valve arranged downstream of the measuring arrangement, the separation chamber being constituted by an annulus bordering on the leakage site in the pipe.

In a preferred embodiment the measuring arrangement is further provided with a gas analyser arranged to be able to show at least some of the gas characteristics in real time while the gas is flowing through the measuring arrangement. A person skilled in the art will be familiar with that a mixture of several separate gases may constitute the gas.

Advantageously the measuring arrangement is further provided with an acoustic measuring device able to detect the level of a liquid surface in the separation chamber, giving a basis for detecting and quantifying any leakage between the pipes.

Advantageously the measuring arrangement is further provided with a density meter to be able to detect two-phase flow in the measuring arrangement.

Figure 2:
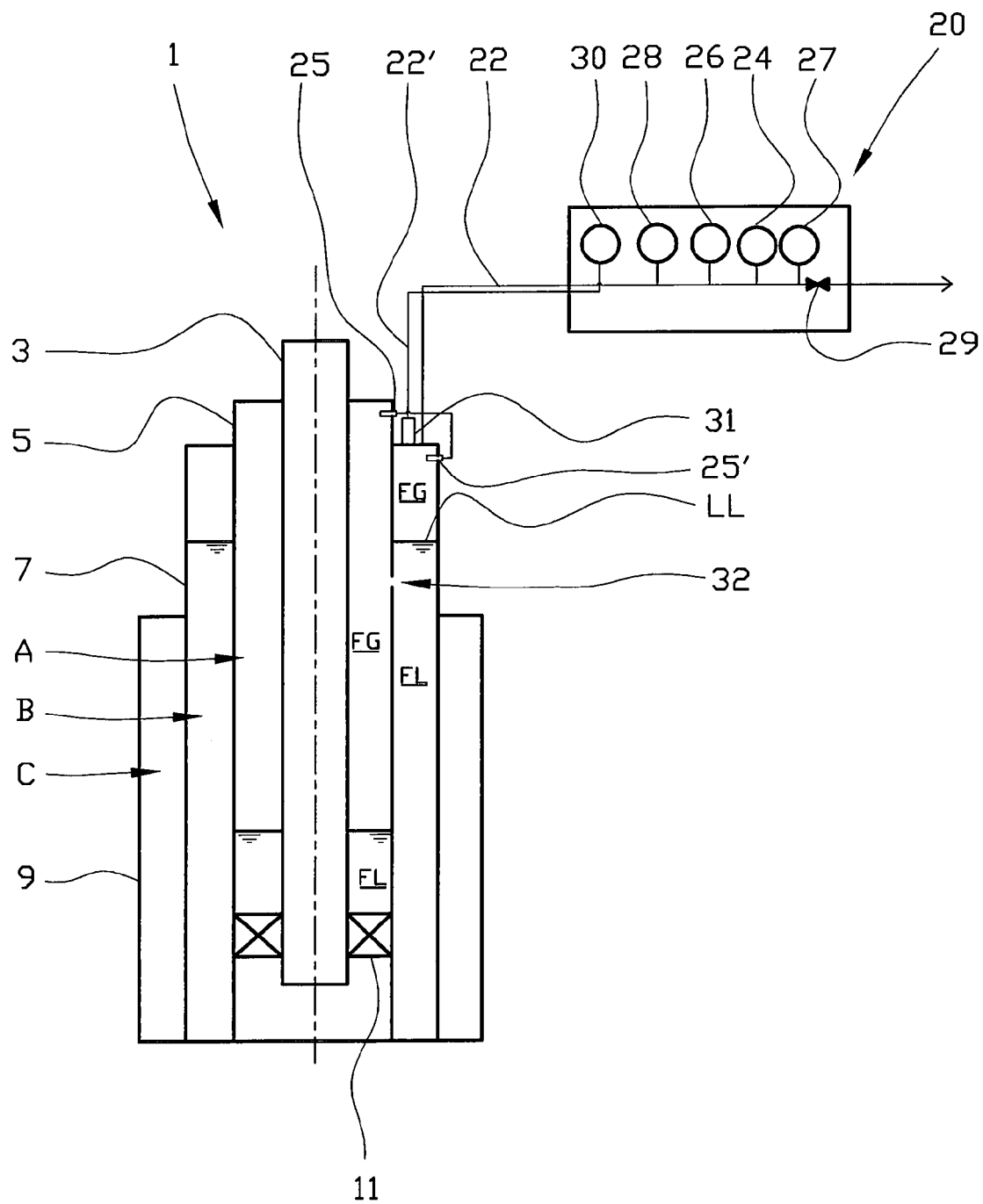
Figure 3:
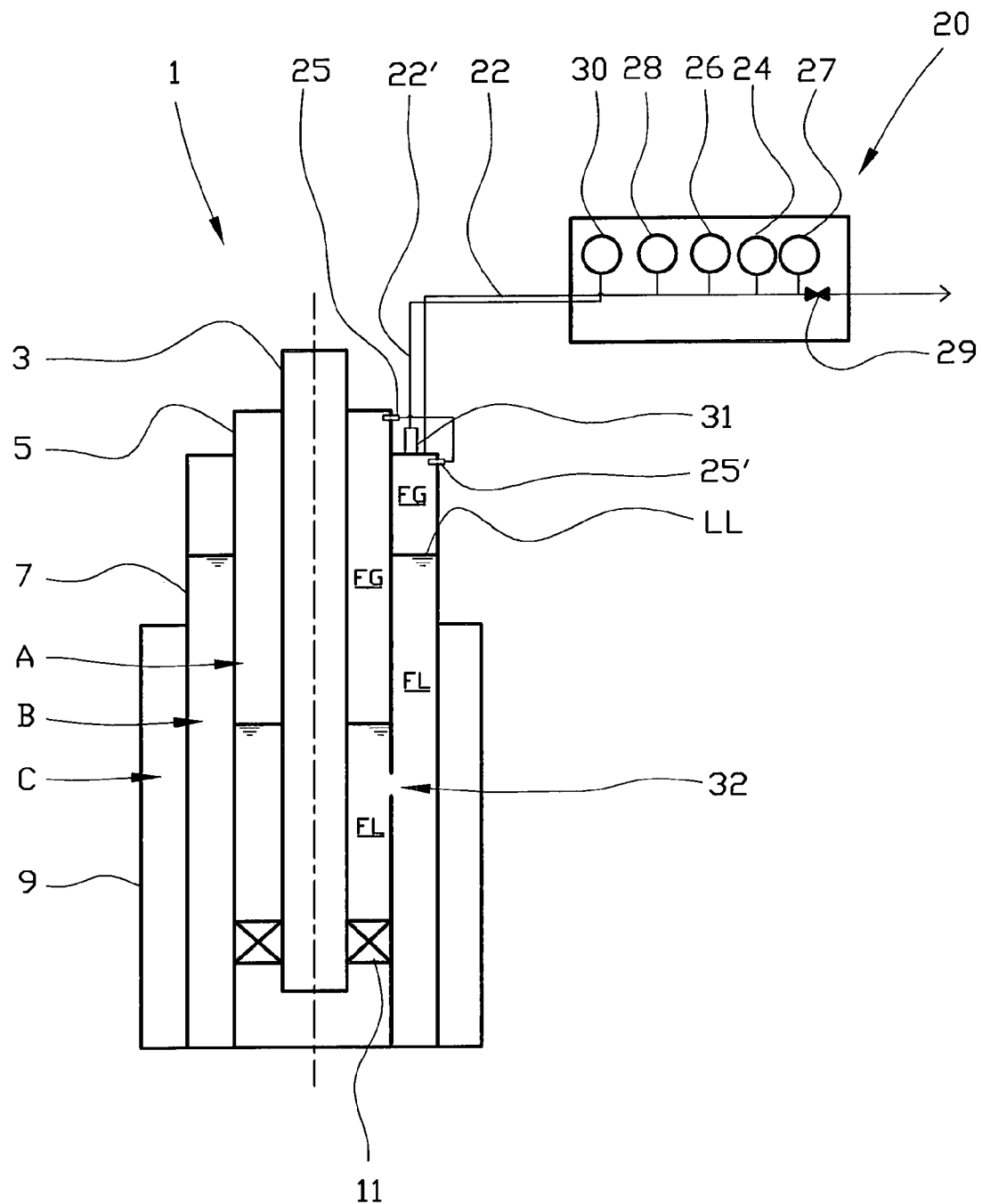

In the following is described an example of a preferred embodiment illustrated in the accompanying drawings, where:
 FIG. 1 shows a principle sketch of a portion of a well provided with a production tubing enclosed by three casings, where an annulus is fluid wise connected to a measuring arrangement in accordance with the invention;
 FIG. 2 shows the same as FIG. 1, but where the measuring arrangement in addition includes measuring equipment able to provide information about the volume of gas in the annulus and the composition of the gas; and
 FIG. 3 shows the same as FIG. 2, but where liquid is flowing between two annuli.

A person skilled in the art will understand that the figures are merely principle sketches and the mutual relative sizes between some of the components are distorted.

In the figures the reference numeral 1 indicates a portion of a well constituted by a central production tubing 3 surrounded by a first casing 5. The first casing 5 is surrounded by a second casing 7, which in turn is surrounded by a third casing 9. The casings 5, 7, 9 are suspended at different heights relative to the production tubing 3 in a way known per se.

Between the production tubing 3 and the first casing 5 is defined an annulus, which for a person skilled in the art will be known as annulus A, or the "A-annulus".

Correspondingly, between the first casing 5 and the second casing 7 there is defined a so-called "B-annulus" and between the second casing 7 and the third casing 9 a so-called "C-annulus" is defined.

In the lower portion of the A-annulus is placed a well barrier in the form of a settable packer element.

A portion of the B- and C-annuli will typically be provided with a permanent sealing medium constituted by such as for example concrete (not shown) injected in the annuli.

The above construction of a well and the purposes of the barriers in the annuli A, B and C will be well known by a person skilled in the art and will therefore not be more thoroughly explained in this document.

In the embodiment shown the B-annulus is fluid wise connected to a measuring arrangement 20 by means of a line 22. The line 22 comprises a pipe/a hose arranged to be able to convey gas from the B-annulus to the measuring arrangement 20, and a signal cable for transmitting signals from a first pressure sensor 25 arranged in connection with the A-annulus and a second pressure sensor 25' arranged in connection with the B-annulus.

In FIG. 1 the measuring arrangement 20 includes a flow meter 24, a pressure meter or gauge 26 and a temperature meter 27. The pressure gauge 26 is connected to the pressure sensors 25, 25' and is arranged to be able to measure the pressure differential between the A-annulus and the B-annulus. In a downstream portion of the measuring arrangement 20 there is in addition provided a pressure-regulating valve 29.

The figure shows a hole 32 that has arisen in an upper portion of the first casing 5. The hole 32 is unwanted and entails that fluid flows from the A-annulus to the B-annulus due to the pressure difference between these. A liquid surface LL of a liquid FL in the B-annulus forms a partition between the liquid FL and a gas FG.

A part of the gas FG flowing from the A-annulus to the B-annulus will be able to condense in the B-annulus. The condensation depends on pressure and temperature conditions between the A-annulus and the B-annulus and of the fluid properties, the so-called PVT-properties. The B-annulus functions thus as a separation chamber for gas and liquid such that only gas FG is conveyed on through the measuring arrangement 20. With that there is no need for a separate separation tank at the surface like the case of currently known measuring arrangements utilising separation chamber.

By means of the pressure-regulating valve 29 the pressure difference between the A-annulus and the B-annulus can be kept constant. It is then assumed that the pressure upstream of the leakage site is constant. With that the leakage rate (volume/unit time) of fluid through the hole 32 will be constant. In FIG. 1 the fluid is a gas FG. By allowing a corresponding flow out from the B-annulus and through the flow meter 24, the leakage rate may be measured directly in real time and with considerably better reliability and accuracy then what may be achieved by means of calculations according to the known and above mentioned pressure build-up analysis. The leakage rate may thus be measured dynamically.

If measurements are made at two different pressure differentials between the A-annulus and the B-annulus and at so-called critical flow through the hole 32, the leakage rate at for example standard conditions 1 atm/15° C. (60° F.) in accordance with criteria given in recognised standards, may be extrapolated. Such a recognised standard is API RP 14B. Said pressure differential is as mentioned above controlled by means of the pressure-regulating valve 29.

Another important object of the pressure-regulating valve 29 is to ensure one-phase flow through the measuring arrangement 20 so that gas condensing in the measuring arrangement 20 is avoided. To avoid condensation as a consequence of temperature drop, a heated line between the pipe and the measuring arrangement may be used. To detect two-phase flow in the measuring arrangement 20, it may be provided with a not shown density meter. If two-phase flow should occur, the density meter will no longer give stable readings. To bring the flow through the measuring arrangement 20 back to one-phase, a heated line between the pipe and the measuring arrangement is used.

It is however advantageous if the properties of the gas are known. By means of only one measurement it will then be possible to find the gas leakage rate at standard/normal conditions according to criteria given in recognised standards. This is done by inputting the gas composition to a simulator, which estimates the behaviour of the gas at different pressure and temperature conditions (a so-called PVT-simulator). In such a simulator the equivalent volume, and thus flow rate, may be calculated at standard/normal conditions. Since the volumetric flow rate is constant under critical flow conditions, the calculated flow rate at atmospheric or standard conditions will be equivalent to the leakage rate.

By having knowledge of the properties of the gas leaking into the annulus, the components of the gas will among other things be known. This may be useful in several connections, among other things for deciding if the gas contains components which may represent a health hazard, and if the gas contains corrosive components. Being able to estimate the original site of the leakage is also useful information being provided in connection with collection of information about the properties of the gas. By comparing the gas properties with the properties of reservoir gas or with any gas being used in connection with so-called gas lift, it may be estimated where the gas leakage is.

In FIG. 2 the measuring arrangement 20 is further provided with a gas chromatograph 28 arranged to be able to make a chromatographic analysis of the gas FG while it is flowing through the measuring arrangement 20. A person skilled in the art will know that gas chromatography in addition to the composition of the gas may among other things bring forward information about the density, compressibility, molecular weight, heat value and acoustic properties of the gas (or gases).

The measuring arrangement 20 includes in FIG. 2 in addition an acoustic measuring instrument 30. The acoustic measuring instrument 30 is connected to an acoustic source 31 shown arranged in an upper end portion of the B-annulus. The acoustic source 31 is connected to the acoustic measuring instrument 30 by means of a line 22'. For the sake of simplicity the acoustic source 31 and the acoustic measuring instrument 30 will in the following be referred to as the acoustic measuring instrument or "echo meter" 30.

The purpose of the acoustic measuring instrument 30 is to be able to provide information about changes in the level of the liquid surface LL in the B-annulus. This may be used to detect changes in the mutual relationship between gas FG and liquid FL in the B-annulus and thereby also any leakage of liquid through the hole 32 in the first casing 5. Such a liquid leakage is shown in FIG. 3.

In FIG. 3 a hole 32 has arisen in the first casing 5 below a liquid surface LL. Liquid PL flows through the hole 32 from the A-annulus to the B-annulus due to a pressure difference therebetween. The pressure difference may also result in some of the liquid FL changing to gas phase FG in the B-annulus.

By means of the pressure-regulating valve 29 is the pressure difference between the A-annulus and the B-annulus being held constant and the gas leakage rate may be measured as described above. In addition the liquid leakage rate may be measured at the same time by means of the acoustic instrument 30 arranged to be able to measure the distance down to the liquid surface LL. When also the diameters of the casings 5, 7 defining the B-annulus are known, the inflowing volume may be calculated.

Even if it does not appear from the figures, it is to be understood that the measuring device 20 may be provided remote from the well, for example on board a production vessel (not shown). This may also be relevant in connection with measurements being executed at seabed installations.

From the above it will be appreciated that the present invention has vary advantageous features compared with known apparatuses and methods for investigating and quantifying leakage rate of a fluid between a first pipe and a second pipe, the first pipe being surrounded by at least a portion of a second pipe. By the very fact that the leakage rate may be measured directly, the measurements may be done considerably faster and with considerably increased reliability and accuracy than what can be obtained by means of the known and above mentioned pressure build-up analysis. There is no need to bleed the annulus pressure to zero, resulting in less strain on piping and surroundings, or shutting down production while measurements are taken. There is neither a need for a separate separation container since the annulus between two casings is used as a separation chamber. The measuring arrangement will thereby be able to be made small and easy to handle, having great importance for example on board a rig where lack of space may be precarious. By using an acoustic measuring instrument the liquid leakage rate may be determined in addition to the gas leakage rate, which is not possible using equipment arranged according to prior art.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:
1. A method for investigating and quantifying leakage rate of a fluid between a first pipe and a second pipe, the first pipe being surrounded by at least a portion of the second pipe, the pipes being arranged in a well in a ground, said method including the steps of:
- installing a measuring arrangement including a flow meter and a pressure gauge in fluid communication with an annulus surrounding a leakage site in the first pipe, the pressure gauge being connected to pressure sensors arranged to measure a pressure difference between the annuli;
- providing by means of a pressure-regulating valve arranged downstream of the measuring arrangement a constant pressure difference between the annuli surrounding the leakage site; and
- conveying through the measuring arrangement fluid in gas phase from the annulus connected to the measuring arrangement, said annulus being utilized as a separation chamber for gas and liquid.

2. The method according to claim 1, wherein the measuring arrangement is further provided with a temperature meter.

3. The method according to claim 1, wherein the method further includes deciding by means of an acoustic measuring device any change in volume of gas in the annulus being connected to the measuring arrangement such that a liquid leakage between the first pipe and the second pipe may be decided simultaneously.

4. The method according to claim 1 wherein the method further includes placing in or in connection with the measuring arrangement a gas analyzer arranged to determine at least some characteristics of the gas.

5. The method according to claim 1 wherein the method further includes providing the measuring arrangement with a density meter arranged to detect two-phase flow in the measuring arrangement.

6. The method according to claim 1, wherein the measuring arrangement is placed remote from the well.

7. An apparatus to investigate and quantify a leakage rate of a fluid between a first pipe and a second pipe, the first pipe being surrounded by at least a portion of the second pipe, where the pipes are arranged in a well in a ground, said apparatus comprising:
- a separation chamber to separate the fluid into a gas phase and a liquid phase; and
- a measuring arrangement being in fluid communication with the separation chamber wherein the measuring arrangement includes a flow meter for gas, a pressure gauge connected to pressure sensors arranged to measure a pressure difference between either side of a leakage site, and a pressure-regulating valve arranged downstream of the measuring arrangement, the separation chamber being constituted by an annulus bordering on the leakage site in the first pipe.

8. An apparatus according to claim 7, wherein the measuring arrangement is further provided with a temperature meter.

9. An apparatus according to claim 7, wherein the measuring arrangement is further provided with a gas analyzer arranged to be able to show at least one characteristic of the gas.

10. An apparatus according to claim 7, wherein the apparatus is provided with acoustic measuring device arranged to detect the level of a liquid surface in the separation chamber.

11. An apparatus according to claim 7, wherein the measuring arrangement is further provided with a density meter to detect two-phase flow in the measuring arrangement.

* * * * *